(No Model.)
D. Y. HALLOCK.
POTATO DIGGER.
No. 376,086. Patented Jan. 10, 1888.
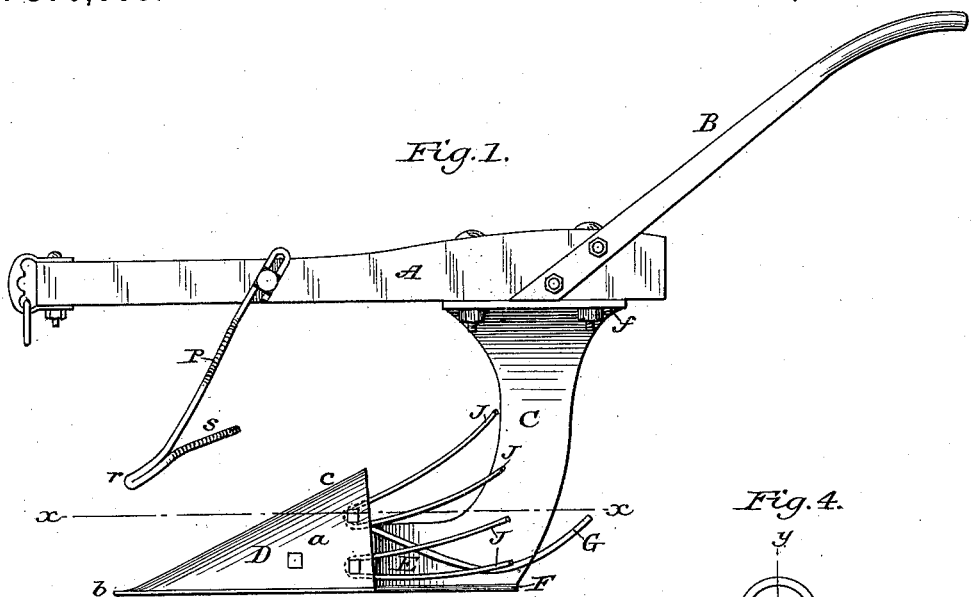
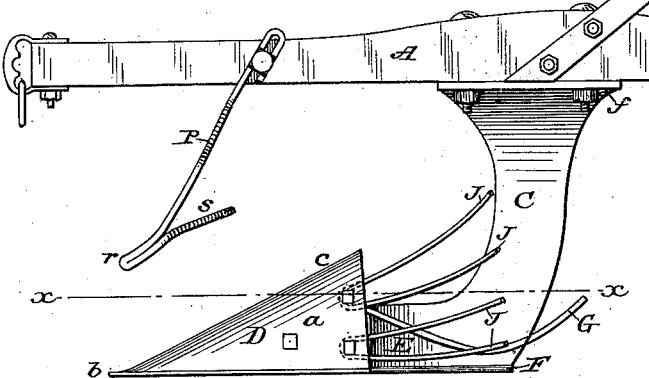
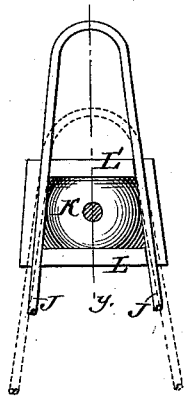
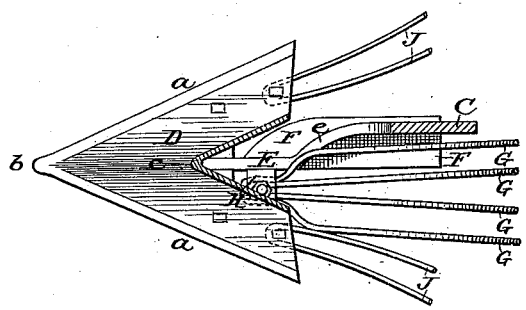
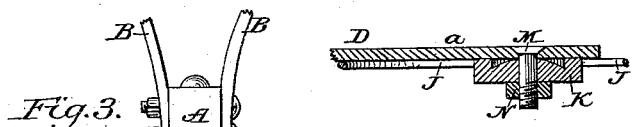
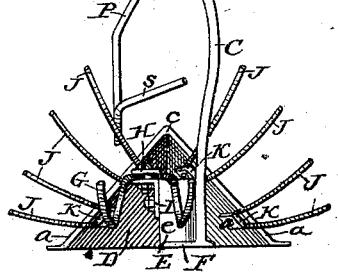
Attest:
A. N. Jesbera
S. A. Starere
Inventor:
Daniel Y. Hallock
By David A. Burr
Atty.

UNITED STATES PATENT OFFICE.

DANIEL Y. HALLOCK, OF SOUTHOLD, NEW YORK.

POTATO-DIGGER.

SPECIFICATION forming part of Letters Patent No. 376,086, dated January 10, 1888.

Application filed February 21, 1887. Serial No. 228,307. (No model.)

*To all whom it may concern:*

Be it known that I, DANIEL Y. HALLOCK, of Southold, in the county of Suffolk and State of New York, have invented certain new and useful Improvements in Potato-Diggers; and I do hereby declare that the following is a full and exact description thereof, reference being had to the accompanying drawings, and to the letters of reference marked thereon, making a part of this specification, in which—

Figure 1 is a side elevation of my improved potato-digger; Fig. 2, a horizontal section of same in line $x$ $x$ of Fig. 1; Fig. 3, an elevation of the digger from the rear; Fig. 4, a detached plan view on an enlarged scale of one of the plates for adjusting and confining the lateral fingers, and Fig. 5 a transverse section of same in line $y$ $y$ of Fig. 4.

The object of my invention is to obviate the disadvantages attending the use of potato-diggers as heretofore constructed, in which the soil dug up by the implement is either delivered wholly to the rear, thereby failing more or less to separate from the soil the potatoes lifted therewith, or else is delivered wholly at the sides, with a like result, and to construct a potato-digger which shall operate effectually to divide the soil containing the tubers into separate portions, which shall be severally sifted through independent sets of rods or fingers and be delivered therefrom partially in the furrow at the rear and partially on each side, insuring thereby a thorough separation of the tubers from the soil and vines and leaving them uncovered by the soil. This object is accomplished in my invention, first, by the use of a double-faced share or shovel whose two sides are inclined at a very acute angle; second, in the combination therewith of a set of horizontally-disposed fingers made to project centrally from the rear of the shovel, the standard of the digger being bent outwardly and laterally to permit of a central adjustment of these horizontal fingers; third, in the combination, with the horizontal fingers, of lateral fingers attached to the inner side of each inclined face of the shovel to project rearwardly therefrom; fourth, in adjusting devices for said fingers, as hereinafter fully described, and, fifth, in a vine-turning attachment secured to the beam in front of the shovel and above it.

In the accompanying drawings, A is the beam, B B the handles, C the standard, and D the shovel, of the potato-digger. The shovel D is made with two faces, $a$ $a$, inclining at an acute angle rearwardly from a central point, $b$, and laterally from an upwardly-inclined ridge, $c$, as shown in Figs. 1 and 3. This pointed double-faced wedge-shaped shovel is united to the beam A by means of an arm or plate, E, firmly secured to the inner under side of the shovel D, and which, extending therefrom horizontally, with its lower edge on a level with the lower edges of the shovel, (see Fig. 1,) is bent laterally immediately back of the shovel, (see at Fig. 2,) so as to extend therefrom rearwardly at one side of the center for a distance equal (more or less) to the length of the shovel, and which terminates in the standard C, whose upper end is bent back (see at $f$, Fig. 3) to pass under the beam A, to which it is attached, whereby the beam is brought into line with the center of the shovel, as shown in Fig. 3, to obtain the customary central line of draft.

The arm E is formed with a wide flat base or shoe, F, upon its lower edge, extending laterally therefrom on each side thereof, as shown in Figs. 2 and 3, so as to serve as a runner to support the plow and prevent the shovel from entering too deeply into the ground.

A series of fingers or wire rods, G G G, radiating from a head, H, are secured by means of a bolt passing through said head to a bracket, I, bolted upon or against the top of the arm E and directly under the rear end of the shovel. These fingers G G project rearwardly from the head H with a downward curve, so as to drop nearly to the ground, and then are bent up rearwardly in manner as shown in Fig. 1, so that the dirt and potatoes carried up to the top of the shovel will fall over upon said fingers and be thereby sifted. A sifting of the soil and roots discharged back from the sides $a$ $a$ of the shovel is also obtained by means of lateral rearwardly-projecting fingers or wire rods J J, which are secured to the side plates, $a$ $a$, of the shovel. These lateral fingers J J are made in pairs by doubling a single wire rod, as shown in Fig. 4, and are adjusted so as to increase or diminish their spread or angle of divergence by means of a spreader or plate, K, Figs. 4 and 5, having two transverse bars or offsets, L L', of different lengths, formed upon one face thereof and at opposite ends of the plate. The double wire is laid upon the plate to embrace the ends of these bars or offsets between them, the shortest bar, L', being next to the bend of the wire, so that by drawing the bend to or from said transverse bar L' the outer ends of the fingers are made to approach or diverge from each other more or less, as required to adapt them to different qualities and conditions of soil. (See dotted lines in Fig. 4.)

The attachment of the fingers to the side $a$ of the shovel is effected by means of a bolt, M, led through a central aperture in the adjusting-plate or spreader K and a corresponding aperture in the shovel and made fast by a nut, N, as shown in Fig. 5, the wire of the finger being confined between the plate and the shovel. The bolt M serves as a pivot upon which the fingers may be turned to adjust their position relatively to the shovel and to the horizontal fingers G G, and when adjusted they are firmly fixed by tightening up the nut N on the bolt.

The vine-turning attachment to operate in conjunction with the shovel and fingers is constructed of a single iron rod or plate, P, attached at its upper end by a bolt passing through an eye or slot formed at said end to the side of the beam A at a point immediately over the shovel, to extend thence laterally at an inclination forward to a point, $r$, Fig. 1, above and at one side of the front end, $b$, of the shovel, where it is doubled back upon itself and then bent to extend transversely, as at $s$, with a slight upward inclination across the width of the shovel, as illustrated in Figs. 1 and 3.

The rod P may be made of a solid forging in substantially the form of the wire above described, and as illustrated in the drawings.

In the use of my improved potato-digger the sharp-pointed shovel readily enters the soil, which, with the potatoes therein, is carried up upon the sides of the shovel. About one-third of the soil thus lifted is dropped over the center of the rear end of the shovel on each side of the apex of its ridge and falls upon the central horizontal set of fingers, G G. By the curvature in the base-plate of the standard the latter is carried so far to one side as to offer no obstruction whatever to this central discharge, which operates to partially fill the furrow with sifted soil.

The remainder of the soil and its contents drops from each side of the shovel rearwardly against and upon the lateral fingers J J. The fingers G G and J J operate to separate the soil from the potatoes, the soil sifting through first and the potatoes dropping afterward, so that the ground is left in a comparatively level condition in the wake of the shovel, with the potatoes upon the surface.

The vine-turner, running under one side of the vines, lifts and presses them all to one side of the digger, so as to be deflected from the shovel and thrown out of the way. The slot through which the bolt passes permits the vine-turner to be raised or lowered, as depth of digging may require.

Any vines which may be carried over the shovel fall between the lateral fingers J J and over the horizontal fingers G G to the rear.

The steep angle of inclination of the sides of the shovel permit the lateral fingers to be set at an angle which will facilitate this central delivery of the vine and soil to the rear, and the adjusting-plates K under each pair of the fingers permit them to be readily set more or less closely to each other and to be turned at such inclination as may be found desirable for the work in hand.

I am aware that landside-plows have heretofore been constructed with standards curved outward or bowed on the land side to prevent the weeds and stubble from choking the plow, and I do not claim, broadly, such a device. The bent standard in my improved implement is for an entirely different purpose, and differs from those heretofore constructed, in that the standard proper is bent near the top thereof only, and the lower end of the upright is connected at one side of the central line of draft to a bent horizontal arm, as hereinbefore described.

I am aware that rods or bars have heretofore been attached to the under side of the rear portion of a double-faced or V-shaped plow-share on each side thereof, the rods being inclined upward from the face of the share as they extend back therefrom; and I do not claim herein as new the use of the lateral fingers J J, attached to the sloping sides of the shovel. My invention embraces, however, an improvement in the existing devices, in that I employ a series of horizontally-disposed fingers, G G, radiating rearwardly from a central point of attachment on the bar under the shovel, which, in combination with the lateral fingers J J, form in effect a horizontal sifting frame or basket to receive the soil and potatoes delivered rearwardly from the shovel in the gap between the two sets of lateral fingers J J.

I am also aware that it is not new to attach a rod, arm, or plate to the beam of a plow, to depend in front of its share, in order to clear away the weeds, &c.; but my improvement consists specially in the novel form of weed-turner herein shown and described, which, made of a single piece of metal of the special construction set forth, differs from all others in its form, which permits it, when it is rigidly attached to the beam, to perform its functions without the aid of any other device or attachment.

I claim as my invention—

1. The combination, in a potato-digger, with the wedge-shaped shovel D and outwardly-bent standard C, of the horizontal bent arm E, connecting the lower end of the standard C with said shovel on a level below that of the top of the shovel, substantially in the manner and for the purpose herein set forth.

2. The combination, in a potato-digger, with the shovel D, bent standard C, and horizontal bent arm E, connecting the lower end of said standard with the shovel, of the flat shoe F upon the bottom edge of the connecting-arm E, substantially in the manner and for the purpose herein set forth.

3. The combination, with the wedge-shaped angular shovel in a potato-digger, of a series of horizontally-disposed fingers or rods radiating rearwardly from a head secured centrally under the shovel, substantially in the manner and for the purpose herein set forth.

4. The combination, in a potato-digger, with the wedge-shaped angular shovel D and with a series of lateral fingers, J J, attached to the sloping sides of the shovel, to project rearwardly therefrom, of a series of intervening horizontally-disposed fingers, G G, radiating rearwardly from a head secured centrally under the shovel, substantially in the manner and for the purpose herein set forth.

5. The combination, in a potato-digger, of the wedge-shaped angular shovel D, beam A, curved standard C, curved plate E, connecting the lower end of the standard with the shovel, central horizontally-disposed fingers or rods, G G, radiating from the under side of the rear of the shovel, and lateral fingers or rods J J, projecting rearwardly from the sloping sides of the shovel, substantially in the manner and for the purpose herein set forth.

6. A spreader-plate, K, formed with transverse bars or offsets L L', of unequal length, in combination with a doubled wire, J J, a bolt, M, and the shovel D in a potato-digger, substantially in the manner and for the purpose herein set forth.

7. The combination, in a potato-digger, with the beam A and the wedge-shaped angular shovel D, of the iron rod P, secured to the side of the beam over the shovel, to depend from the beam with a lateral and forward inclination, and which is constructed with an arm, S, made to project from its lower end both upwardly and transversely to the length of the beam, over and above the shovel, substantially in the manner and for the purpose herein set forth.

In testimony whereof I have signed my name to this specification in the presence of two subscribing witnesses.

DANIEL Y. HALLOCK.

Witnesses:
  WM. A. COCHRAN,
  D. E. HALLOCK.